(12) United States Patent
Wu et al.

(10) Patent No.: US 11,374,709 B2
(45) Date of Patent: Jun. 28, 2022

(54) METHOD AND APPARATUS FOR SENDING REFERENCE SIGNAL, AND METHOD AND APPARATUS FOR OBTAINING REFERENCE SIGNAL

(71) Applicant: Huawei Technologies Co., Ltd., Shenzhen (CN)

(72) Inventors: Lu Wu, Shenzhen (CN); Yong Liu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/401,826

(22) Filed: May 2, 2019

(65) Prior Publication Data

US 2019/0260538 A1     Aug. 22, 2019

Related U.S. Application Data

(63) Continuation of application No. PCT/CN2017/100415, filed on Sep. 4, 2017.

(30) Foreign Application Priority Data

Nov. 3, 2016   (CN) .......................... 201610953606.6
Nov. 17, 2016  (CN) .......................... 201611027749.0

(51) Int. Cl.
  *H04L 5/00*      (2006.01)
  *H04L 27/26*     (2006.01)

(52) U.S. Cl.
  CPC ............ *H04L 5/0048* (2013.01); *H04L 5/005* (2013.01); *H04L 5/0007* (2013.01);
  (Continued)

(58) Field of Classification Search
  CPC . H04L 27/2611; H04L 5/0007; H04L 5/0023; H04L 5/0048; H04L 5/005;
  (Continued)

(56) References Cited

U.S. PATENT DOCUMENTS

| 2011/0110442 A1 | 5/2011 | Wu et al. |
| 2012/0155414 A1* | 6/2012 | Noh ....................... H04L 5/0048 370/329 |

(Continued)

FOREIGN PATENT DOCUMENTS

| CN | 101932073 A | 12/2010 |
| CN | 102469059 A | 5/2012 |

(Continued)

OTHER PUBLICATIONS

"CSI-RS design for 12 and 16 ports," 3GPP TSG RAN WG1 Meeting #82bis, Malmo, Sweden, R1-155836, 3rd Generation Partnership Project, Valbonne, France (Oct. 5-9, 2015).

(Continued)

*Primary Examiner* — Awet Haile
(74) *Attorney, Agent, or Firm* — Leydig, Voit & Mayer, Ltd.

(57) ABSTRACT

Embodiments of the present disclosure provide a method and an apparatus for sending a reference signal, and a method and an apparatus for obtaining a reference signal. The method for sending a reference signal includes: determining, based on a resource that is allocated to a reference signal in a basic pattern corresponding to the reference signal and a resource that is allocated to at least one basic pattern in a physical layer transmission unit, a resource occupied by the reference signal in the physical layer transmission unit; and sending the reference signal through the determined resource. It can be learned that, according to the technical solutions provided in the embodiments of the (Continued)

present disclosure, arrangement of the reference signal in the physical layer transmission unit can be flexibly set.

17 Claims, 8 Drawing Sheets

(52) U.S. Cl.
CPC ........ *H04L 5/0051* (2013.01); *H04L 27/2611* (2013.01); *H04L 5/0023* (2013.01)

(58) Field of Classification Search
CPC .. H04L 5/0051; H04L 5/0053; H04J 11/0073; H04J 11/0076; H04J 2011/0096; H04W 48/12; H04W 72/04
See application file for complete search history.

(56) References Cited

U.S. PATENT DOCUMENTS

| | | | | |
|---|---|---|---|---|
| 2013/0176978 A1* | 7/2013 | Abe | ...................... | H04L 5/0098 370/329 |
| 2014/0204853 A1* | 7/2014 | Ko | ...................... | H04L 5/0035 370/329 |
| 2015/0223208 A1* | 8/2015 | Park | ...................... | H04L 5/0057 370/329 |
| 2016/0006550 A1 | 1/2016 | Cheng et al. | | |
| 2016/0044669 A1* | 2/2016 | Yoon | ...................... | H04W 76/14 370/336 |
| 2017/0257202 A1 | 9/2017 | Zhang et al. | | |
| 2018/0359014 A1* | 12/2018 | Noh | ...................... | H04B 7/0417 |

FOREIGN PATENT DOCUMENTS

| | | |
|---|---|---|
| CN | 103944685 A | 7/2014 |
| CN | 104581835 A | 4/2015 |
| WO | 2009120029 A2 | 10/2009 |
| WO | 2015154505 A1 | 10/2015 |

OTHER PUBLICATIONS

"DL CSI-RS design for NR CSI acquisition," 3GPP TSG RAN WG1 Meeting #87, Reno, USA, R1-1611241, 3rd Generation Partnership Project, Valbonne, France (Nov. 14-18, 2016).

"DL RS Design for NR Beam Management," 3GPP TSG RAN WG1 Meeting #87, Reno, NV, USA, R1-1611242, 3rd Generation Partnership Project, Valbonne, France (Nov. 14-18, 2016).

"DL Reference Signal Design for 8×8 MIMO in LTE-Advanced," 3GPP TSG-RAN1 #56, Athens, Greece, R1-090706, pp. 1-12, 3rd Generation Partnership Project, Valbonne, France (Feb. 9-13, 2009).

* cited by examiner

600

700

US 11,374,709 B2

METHOD AND APPARATUS FOR SENDING REFERENCE SIGNAL, AND METHOD AND APPARATUS FOR OBTAINING REFERENCE SIGNAL

CROSS-REFERENCE TO RELATED APPLICATIONS

This application is a continuation of International Application No. PCT/CN2017/100415, filed on Sep. 4, 2017, which claims priority to Chinese Patent Application No. 201610953606.6, filed on Nov. 3, 2016 and Chinese Patent Application No. 201611027749.0, filed on Nov. 17, 2016. All of the aforementioned patent applications are hereby incorporated by reference in their entireties.

TECHNICAL FIELD

Embodiments of the present disclosure relates to wireless communications technologies, and in particular, to a method and an apparatus for sending a reference signal, and a method and an apparatus for obtaining a reference signal.

BACKGROUND

A reference signal (RS) is also referred to as a pilot or a training sequence, and is known to a transmit end device and a receive end device. The reference signal has a plurality of purposes. Based on specific purposes, the reference signal may be classified into a plurality of types, for example but not limited to, a reference signal used to obtain channel state information (CSI), a reference signal used to demodulate a received signal, and a reference signal used for beam management. Particularly, some reference signals may have a plurality of purposes. A manner of transmitting the reference signal and configuration of a resource for carrying the reference signal may vary according to a purpose of the reference signal.

In the prior art, a reference signal is usually arranged according to a fixed resource distribution pattern. FIG. 1 is a schematic diagram of an example of a resource distribution pattern 100 of an existing reference signal. As shown in FIG. 1, resource elements (RE) occupied by a reference signal R corresponding to an antenna port are distributed in two resource blocks 104 and 106 included in a resource block pair 102. In the resource block pair 102, the resource elements for carrying the reference signal have fixed locations.

Such a manner of arranging a reference signal according to a fixed resource distribution pattern is inflexible, and is problematic in different scenarios.

SUMMARY

In view of this, it is necessary to provide a method for sending a reference signal, to flexibly arrange the reference signal.

In addition, a method for obtaining a reference signal is provided, to flexibly arrange the reference signal.

In addition, an apparatus for sending a reference signal is provided, to flexibly arrange the reference signal.

In addition, an apparatus for obtaining a reference signal is provided, to flexibly arrange the reference signal.

According to a first aspect of the embodiments of the present disclosure, a method for sending a reference signal is provided, including: determining, based on a resource that is allocated to a reference signal in a basic pattern corresponding to the reference signal and a resource that is allocated to at least one basic pattern in a physical layer transmission unit, a resource to be occupied by the reference signal in the physical layer transmission unit; and sending the reference signal through the determined resource.

In a possible design, the basic pattern occupies at least one OFDM symbol in time domain, and occupies at least one subcarrier in frequency domain. In addition, in a possible design, in the basic pattern, the reference signal occupies at least one OFDM symbol in time domain, and occupies at least one subcarrier in frequency domain. Moreover, in a possible design, the at least one OFDM symbol occupied by the reference signal in the basic pattern in time domain is a plurality of consecutive OFDM symbols. In addition, in a possible design, the reference signal is used for at least one of the following objectives: determining channel state information; performing beam management; and demodulating a received signal.

Moreover, in a possible design, the basic pattern of the reference signal is known to a transmit end device of the reference signal and a receive end device of the reference signal. In a specific implementation process, the basic pattern of the reference signal may be predefined in a design specification of a communications standard or a communications system.

In addition, in a possible design, the method further includes a step that the transmit end device notifies the receive end device of the resource that is allocated to the at least one basic pattern in the physical layer transmission unit. Further, the transmit end device may notify, by using physical layer signaling, the receive end device of the resource that is allocated to the at least one basic pattern in the physical layer transmission unit.

In a possible design, a quantity of reference signals corresponding to a basic pattern carried in the physical layer transmission unit, a quantity of basic patterns of each reference signal in the physical layer transmission unit, and a resource occupied by the basic pattern in the physical layer transmission unit may be set based on a specific requirement. In addition, one physical layer transmission unit may carry a basic pattern of at least one reference signal. In addition, one physical layer transmission unit may carry one or more basic patterns of a same reference signal. Moreover, a resource occupied by each basic pattern of each reference signal in the physical layer transmission unit may be set based on a specific requirement.

In a possible design, a quantity of OFDM symbols occupied by the basic pattern of the reference signal in time domain, a quantity of subcarriers occupied by the basic pattern of the reference signal in frequency domain, and a resource occupied by the reference signal in the basic pattern of the reference signal may be set based on a specific requirement. Further, the basic pattern of the reference signal may occupy at least one OFDM symbol in time domain, and may occupy at least one subcarrier in frequency domain, the at least one OFDM symbol may be consecutive, and the at least one subcarrier may also be consecutive. In the basic pattern of the reference signal, the reference signal may occupy at least one OFDM symbol in time domain, and may occupy at least one subcarrier in frequency domain.

According to another aspect of the embodiments of the present disclosure, a method for obtaining a reference signal is provided, including: determining, based on a resource that is allocated to a reference signal in a basic pattern corresponding to the reference signal and a resource that is allocated to at least one basic pattern in a physical layer transmission unit, a resource occupied by the reference signal in the physical layer transmission unit; and obtaining the reference signal through the determined resource.

In a possible design, the basic pattern occupies at least one OFDM symbol in time domain, and occupies at least one subcarrier in frequency domain. In addition, in a possible design, in the basic pattern, the reference signal occupies at least one OFDM symbol in time domain, and occupies at least one subcarrier in frequency domain. Moreover, in a possible design, the at least one OFDM symbol occupied by the reference signal in the basic pattern in time domain is a plurality of consecutive OFDM symbols. In addition, in a possible design, the reference signal is used for at least one of the following objectives: determining channel state information; performing beam management; and demodulating a received signal.

Moreover, in a possible design, the basic pattern of the reference signal is known to a transmit end device of the reference signal and a receive end device of the reference signal. In a specific implementation process, the basic pattern of the reference signal may be predefined in a design specification of a communications standard or a communications system.

In addition, in a possible design, the method may further include a step that the receive end device obtains the resource that is allocated to the at least one basic pattern in the physical layer transmission unit. Further, information carrying the resource that is allocated to the at least one basic pattern in the physical layer transmission unit may be sent from the transmit end device to the receive end device by using physical layer signaling.

In a possible design, a quantity of reference signals corresponding to a basic pattern carried in the physical layer transmission unit, a quantity of basic patterns of each reference signal in the physical layer transmission unit, and a resource occupied by the basic pattern in the physical layer transmission unit may be set based on a specific requirement. In addition, one physical layer transmission unit may carry a basic pattern of at least one reference signal. In addition, one physical layer transmission unit may carry one or more basic patterns of a same reference signal. Moreover, a resource occupied by each basic pattern of each reference signal in the physical layer transmission unit may be set based on a specific requirement.

In a possible design, a quantity of OFDM symbols occupied by the basic pattern of the reference signal in time domain, a quantity of subcarriers occupied by the basic pattern of the reference signal in frequency domain, and a resource occupied by the reference signal in the basic pattern of the reference signal may be set based on a specific requirement. Further, the basic pattern of the reference signal may occupy at least one OFDM symbol in time domain, and may occupy at least one subcarrier in frequency domain, the at least one OFDM symbol may be consecutive, and the at least one subcarrier may also be consecutive. In the basic pattern, the reference signal may occupy at least one OFDM symbol in time domain, and may occupy at least one subcarrier in frequency domain.

According to still another aspect of the embodiments of the present disclosure, an apparatus for sending a reference signal is provided, including: a determining module, configured to determine, based on a resource that is allocated to a reference signal in a basic pattern corresponding to the reference signal and a resource that is allocated to at least one basic pattern in a physical layer transmission unit, a resource to be occupied by the reference signal in the physical layer transmission unit; and a sending module, configured to send the reference signal through the determined resource.

In a possible design, the basic pattern occupies at least one OFDM symbol in time domain, and occupies at least one subcarrier in frequency domain. In addition, in a possible design, in the basic pattern, the reference signal occupies at least one OFDM symbol in time domain, and occupies at least one subcarrier in frequency domain. Moreover, in a possible design, the at least one OFDM symbol occupied by the reference signal in the basic pattern in time domain is a plurality of consecutive OFDM symbols. In addition, in a possible design, the reference signal is used for at least one of the following objectives: determining channel state information; performing beam management; and demodulating a received signal.

Moreover, in a possible design, the basic pattern of the reference signal is known to a transmit end device of the reference signal and a receive end device of the reference signal. In a specific implementation process, the basic pattern of the reference signal may be predefined in a design specification of a communications standard or a communications system.

In addition, in a possible design, the sending module may be further configured to send, to the receive end device, information about the resource that is allocated to the at least one basic pattern in the physical layer transmission unit. Further, the information may be carried in physical layer signaling.

In a possible design, a quantity of reference signals corresponding to a basic pattern carried in the physical layer transmission unit, a quantity of basic patterns of each reference signal in the physical layer transmission unit, and a resource occupied by the basic patterns in the physical layer transmission unit may be set based on a specific requirement. In addition, one physical layer transmission unit may carry a basic pattern of at least one reference signal. In addition, one physical layer transmission unit may carry one or more basic patterns of a same reference signal. Moreover, a resource occupied by each basic pattern of each reference signal in the physical layer transmission unit may be set based on a specific requirement.

In a possible design, a quantity of OFDM symbols occupied by the basic pattern of the reference signal in time domain, a quantity of subcarriers occupied by the basic pattern of the reference signal in frequency domain, and a resource occupied by the reference signal in the basic pattern of the reference signal may be set based on a specific requirement. Further, the basic pattern of the reference signal may occupy at least one OFDM symbol in time domain, and may occupy at least one subcarrier in frequency domain, the at least one OFDM symbol may be consecutive, and the at least one subcarrier may also be consecutive. In the basic pattern, the reference signal may occupy at least one OFDM symbol in time domain, and may occupy at least one subcarrier in frequency domain.

According to yet another aspect of the embodiments of the present disclosure, an apparatus for obtaining a reference signal is provided, including: a determining module, configured to determine, based on a resource that is allocated to a reference signal in a basic pattern corresponding to the reference signal and a resource that is allocated to at least one basic pattern in a physical layer transmission unit, a resource occupied by the reference signal in the physical layer transmission unit; and an obtaining module, configured to obtain the reference signal through the determined resource.

In a possible design, the basic pattern occupies at least one OFDM symbol in time domain, and occupies at least one subcarrier in frequency domain. In addition, in a possible design, in the basic pattern, the reference signal occupies at least one OFDM symbol in time domain, and occupies at least one subcarrier in frequency domain. Moreover, in a possible design, the at least one OFDM symbol occupied by the reference signal in the basic pattern in time domain is a plurality of consecutive OFDM symbols. In addition, in a possible design, the reference signal is used for at least one of the following objectives: determining channel state information; performing beam management; and demodulating a received signal.

Moreover, in a possible design, the basic pattern of the reference signal is known to a transmit end device of the reference signal and a receive end device of the reference signal. In a specific implementation process, the basic pattern of the reference signal may be predefined in a design specification of a communications standard or a communications system.

In addition, in a possible design, the determining module may be further configured to obtain information about the resource that is allocated to the at least one basic pattern in the physical layer transmission unit. Further, the information may be carried in physical layer signaling.

In a possible design, a quantity of reference signals corresponding to a basic pattern carried in the physical layer transmission unit, a quantity of basic patterns of each reference signal in the physical layer transmission unit, and a resource occupied by the basic pattern in the physical layer transmission unit may be set based on a specific requirement. In addition, one physical layer transmission unit may carry a basic pattern of at least one reference signal. In addition, one physical layer transmission unit may carry one or more basic patterns of a same reference signal. Moreover, a resource occupied by each basic pattern of each reference signal in the physical layer transmission unit may be set based on a specific requirement.

In a possible design, a quantity of OFDM symbols occupied by the basic pattern of the reference signal in time domain, a quantity of subcarriers occupied by the basic pattern of the reference signal in frequency domain, and a resource occupied by the reference signal in the basic pattern of the reference signal may be set based on a specific requirement. Further, the basic pattern of the reference signal may occupy at least one OFDM symbol in time domain, and may occupy at least one subcarrier in frequency domain, the at least one OFDM symbol may be consecutive, and the at least one subcarrier may also be consecutive. In the basic pattern, the reference signal may occupy at least one OFDM symbol in time domain, and may occupy at least one subcarrier in frequency domain.

According to the technical solutions provided in the embodiments of the present disclosure, arrangement of the reference signal carried in the basic pattern in the physical layer transmission unit can be set by adjusting a quantity of basic patterns carried in the physical layer transmission unit and a location of a resource occupied by each basic pattern in the physical layer transmission unit. It can be learned that, according to the technical solutions provided in the embodiments of the present disclosure, compared with a fixed reference signal arrangement manner in the prior art, arrangement of the reference signal in the physical layer transmission unit can be flexibly set.

In addition, according to the technical solutions provided in the embodiments of the present disclosure, based on a specific requirement, for example but not limited to, received signal quality of the receive end device, a channel state, a moving speed, a quantity of data streams for which spatial multiplexing is performed, a processing capability, a quantity of simultaneously scheduled receive end devices, a related design parameter of beam management, or system bandwidth, the transmit end device adjusts the quantity of basic patterns carried in the physical layer transmission unit and the location of the resource occupied by each basic pattern in the physical layer transmission unit, to flexibly adjust arrangement of the reference signal carried in the basic pattern in the physical layer transmission unit.

DESCRIPTION OF EMBODIMENTS

In technical solutions provided in the embodiments of the present disclosure, a corresponding basic pattern is set for a reference signal, and a plurality of different arrangement manners of the reference signal in a physical layer transmission unit can be designed by adjusting a resource occupied by at least one basic pattern in the physical layer transmission unit, to meet different requirements on the reference signal in different scenarios. It can be learned that, according to the technical solutions provided in the embodiments of the present disclosure, arrangement of the reference signal in the physical layer transmission unit can be flexibly set. The following describes the technical solutions provided in the embodiments of the present disclosure in detail with reference to corresponding accompanying drawings.

Figure 1:
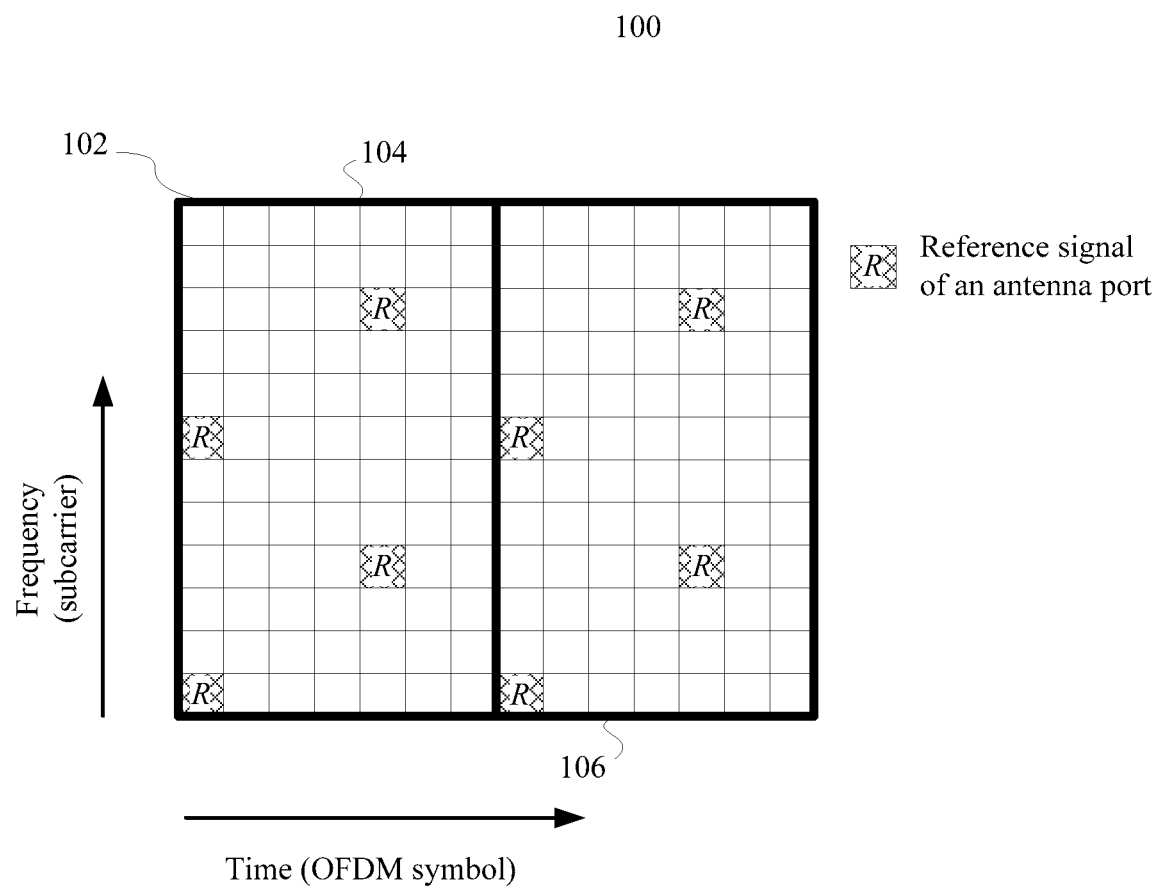
FIG. 1 is a schematic diagram of an example of a resource distribution pattern of an existing reference signal.
Figure 2:
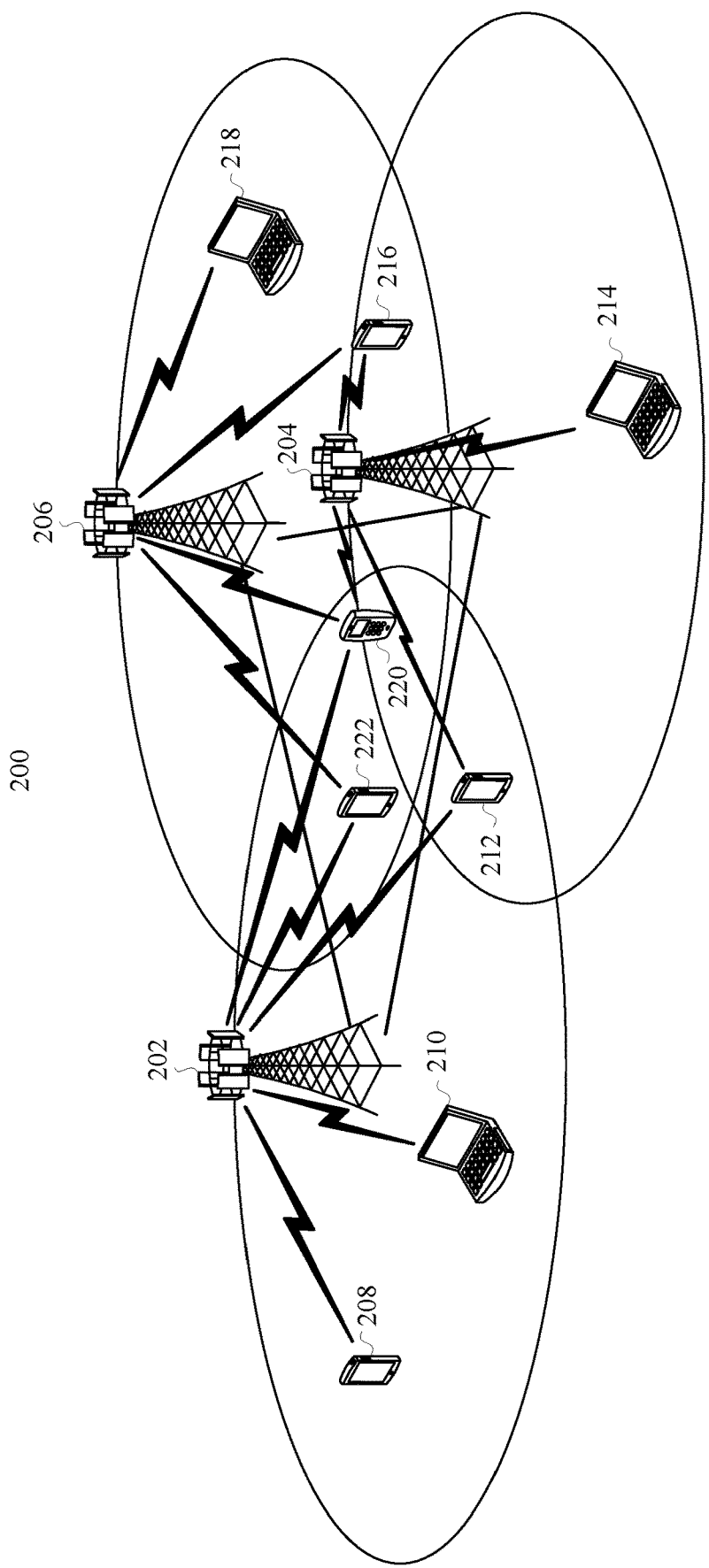
FIG. 2 is a schematic diagram of an example of a wireless communications network according to an embodiment of the present disclosure.

FIG. 2 is a schematic diagram of an example of a wireless communications network 200 according to an embodiment of the present disclosure. As shown in FIG. 2, the wireless communications network 200 includes base stations 202 to 206 and terminal devices 208 to 222. The base stations 202 to 206 may communicate with each other over backhaul (backhaul) links (shown by straight lines between the base stations 202 to 206). The backhaul link may be a wired backhaul link (for example, an optical fiber or a copper cable), or may be a wireless backhaul link (for example, microwave). The terminal devices 208 to 222 may communicate with the corresponding base stations 202 to 206 over radio links (shown by polygonal lines between the base stations 202 to 206 and the terminal devices 208 to 222).

The base stations 202 to 206 are configured to provide a wireless access service for the terminal devices 208 to 222. Specifically, each base station corresponds to a service coverage area (which may also be referred to as a cell, and is shown by each elliptical area in FIG. 2). A terminal device that enters the area may communicate with the base station by using a radio signal, to accept the wireless access service provided by the base station. Service coverage areas of base stations may overlap, and a terminal device in an overlapping area may receive radio signals from a plurality of base stations. Therefore, the plurality of base stations may serve the terminal device. For example, the plurality of base stations may serve the terminal device in the overlapping area by using a coordinated multipoint (CoMP) technology. For example, as shown in FIG. 2, an overlapping area exists between service coverage areas of the base station 202 and the base station 204, and the terminal device 212 is in the overlapping area. Therefore, the terminal device 212 may receive radio signals from the base station 202 and the base station 204, and both the base station 202 and the base station 204 may serve the terminal device 212. For another example, as shown in FIG. 2, a common overlapping area exists among service coverage areas of the base station 202, the base station 204, and the base station 206, and the terminal device 220 is in the overlapping area. Therefore, the terminal device 220 may receive radio signals from the base station 202, the base station 204, and the base station 206, and the base station 202, the base station 204, and the base station 206 may all serve the terminal device 220.

Depending on a used wireless communications technology, the base station may also be referred to as a NodeB, an evolved NodeB (eNodeB), an access point (AP), or the like. In addition, based on sizes of coverage areas of provided services, the base stations may be classified as a macro base station configured to provide a macro cell, a micro base station configured to provide a micro cell (Pico cell), or a femto base station configured to provide a femto cell. With continuous evolution of wireless communications technologies, a future base station may have another name.

The terminal devices 208 to 222 may be various wireless communications devices having a wireless communication function, for example but not limited to, a mobile cellular phone, a cordless telephone set, a personal digital assistant (PDA), a smartphone, a notebook computer, a tablet computer, a wireless data card, a wireless modem (Modulator-demodulator, Modem), and a wearable device such as a smartwatch. With rise of the Internet of Things (IoT) technology, an increasing quantity of devices that previously do not have a communication function, for example but not limited to, household appliances, vehicles, tools, service devices, and service facilities, begin to obtain the wireless communication function with a wireless communications unit configured, so that the devices can access a wireless communications network and be remotely controlled. Such devices have the wireless communication function because they are configured with the wireless communications unit, and therefore also fall within a scope of wireless communications devices. In addition, the terminal devices 208 to 222 each may also be referred to as a mobile station, a mobile device, a mobile terminal, a wireless terminal, a handheld device, a client, or the like.

The base stations 202 to 206 and the terminal devices 208 to 222 may all have a plurality of antennas configured, to support a MIMO (Multiple Input Multiple Output) technology. Further, the terminal devices 208 to 222 may support a single-user MIMO (SU-MIMO) technology, and may also support multi-user MIMO (MU-MIMO). The MU-MIMO may be implemented based on a space division multiple access (SDMA) technology. Because of the plurality of configured antennas, the base stations 202 to 206 and the terminal devices 208 to 222 may further flexibly support a single input single output (SISO) technology, a single input multiple output (SIMO) technology, and a multiple input single output (MISO) technology, to implement various diversity (for example but not limited to, transmit diversity and receive diversity) and multiplexing technologies. The diversity technology may include, for example but not limited to, a transmit diversity (TD) technology and a receive diversity (RD) technology. The multiplexing technology may be a spatial multiplexing technology. Moreover, the foregoing technologies may further include a plurality of implementation solutions. For example, current common transmit diversity may include diversity manners, for example but not limited to, space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and diversity manners obtained after derivation, evolution, and combination of the foregoing diversity manners. For example, in a current LTE (Long Term Evolution) standard, transmit diversity manners such as space time block coding (STBC), space frequency block coding (SFBC), and the CDD are used.

Moreover, the base station 202 to 206 may communicate with the terminal devices 204 to 222 by using various wireless communications technologies, for example but not limited to, a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an orthogonal frequency division multiple access (Orthogonal FDMA, OFDMA) technology, a single carrier frequency division multiple access (Single Carrier FDMA, SC-FDMA) technology, a space division multiple access (SDMA) technology, and technologies evolved and derived from these technologies. The foregoing wireless communications technologies are adopted as a radio access technology (RAT) in numerous wireless communications standards, to construct various wireless communications systems (or networks) nowadays widely known to people, including but not limited to, a Global System for Mobile Communications (GSM) system, a CDMA2000, a Wideband CDMA (WCDMA), Wi-Fi defined in the 802.11 series standard, Worldwide Interoperability for Microwave Access (WiMAX), Long Term Evolution (LTE), LTE-Advanced (LTE-A), and systems evolved from these wireless communications systems. The wireless communications network shown in FIG. 2 may be any system or network in the foregoing wireless communications systems. Unless otherwise stated, the technical solutions provided in the embodiments of the present disclosure may be applied to the foregoing wireless communications technologies and wireless communications systems. In addition, the terms "system" and "network" can be interchanged with each other.

It should be noted that, the wireless communications network 200 shown in FIG. 2 is merely an example, and is not intended to limit the technical solutions of the present disclosure. A person skilled in the art should understand that, in a specific implementation process, the wireless communications network 200 further includes another device, for example but not limited to, a base station controller (BSC), and quantities of the base stations and the terminal devices may be configured based on a specific requirement.

Figure 3:
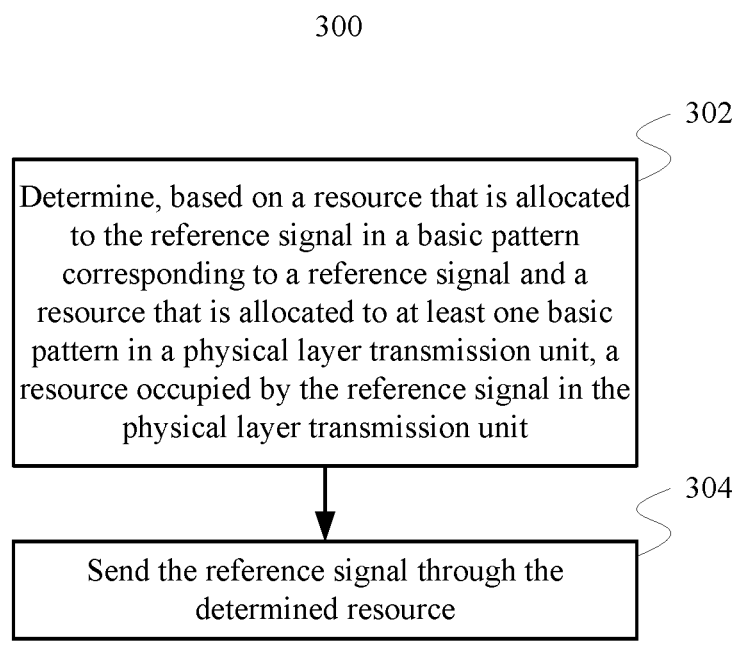
FIG. 3 is an example flowchart of a method for sending a reference signal according to an embodiment of the present disclosure.

FIG. 3 is an example flowchart of a method 300 for sending a reference signal according to an embodiment of the present disclosure. In a specific implementation process, the method 300 may be performed by a transmit end device. The transmit end device may be, for example but not limited to, the base stations 202 to 206 or the terminal devices 208 to 222 in FIG. 2.

Step 302: Determine, based on a resource that is allocated to a reference signal in a basic pattern corresponding to the reference signal and a resource that is allocated to at least one basic pattern in a physical layer transmission unit, a resource to be occupied by the reference signal in the physical layer transmission unit.

Step 304: Send the reference signal through the determined resource.

In the method 300, the basic pattern may occupy at least one OFDM symbol in time domain, and may occupy at least one subcarrier in frequency domain. In addition, in the basic pattern, the reference signal may occupy at least one OFDM symbol in time domain, and may occupy at least one subcarrier in frequency domain. In other words, the resource that is allocated to the reference signal in the basic pattern corresponding to the reference signal may include at least one OFDM symbol in time domain, and may include at least one subcarrier in frequency domain. More specifically, the at least one OFDM symbol occupied by the reference signal in the basic pattern in time domain may be a plurality of consecutive OFDM symbols.

It should be noted that, in a specific implementation process, the OFDM symbol may be replaced with a time unit or a time domain resource in another form, and the subcarrier may be replaced with a frequency unit or a frequency domain resource in another form.

The reference signal is used for at least one of the following objectives:
determining channel state information;
performing beam management; and
demodulating a received signal.

A typical example of a reference signal used to determine channel state information is a channel state information reference signal (CSI-RS) used in an LTE standard. A typical process of determining the CSI based on the CSI-RS is: A base station transmits the CSI-RS, and the CSI-RS is received by a terminal device through propagation on a channel. The terminal device compares the received CSI-RS with the CSI-RS transmitted by the base station (the CSI-RS transmitted by the base station is known to the terminal device), to perform channel estimation and obtain channel information, such as a channel matrix. Based on the channel information, a codebook, and other information, the terminal device may further determine the channel state information, including, for example but not limited to, a precoding matrix indicator (PMI), a channel quality indicator (CQI), and a rank indication (RI).

A typical example of a reference signal used to demodulate a received signal is a demodulation reference signal (DMRS) used in the LTE standard. Because the DMRS and data are precoded by using a same precoding matrix, channel estimation may be performed on a precoded channel (also referred to as an equivalent channel) based on the DMRS, and the data may be demodulated based on a result of the channel estimation.

In a 5G wireless communications system currently in a design stage, data is transmitted by using a high-frequency radio signal. The high-frequency radio signal fades relatively fast. Therefore, a beamforming technology, for example but not limited to, digital beamforming, analog beamforming, or hybrid beamforming, needs to be used to improve received signal quality. In a process of transmitting data based on a beam, a reference signal needs to be used in many processes, for example but not limited to, beam sweeping, beam selection, and beam tracking. The reference signal used during implementation of the processes may be referred to as a reference signal used for beam management. A related function of the reference signal is clearly described in the prior art, for example but not limited to, a proposal submitted by a vendor in the industry at a standard organization meeting. Details are not described herein.

In a specific implementation process, a same type of reference signal may have a plurality of different purposes. A typical example of this type of reference signal is a cell-specific reference signal (CRS) used in the LTE standard. The CRS is a common reference signal, and all user equipment in a cell may use a CRS of the cell. The CRS can be used to obtain channel state information, and can also be used to demodulate a received signal. Similarly, a reference signal is described in the prior art, for example but not limited to, in a proposal submitted by a vendor in the industry at a standard organization meeting. The reference signal can be used to determine channel state information, and can also be used for beam management. For specific details of the reference signal, refer to the related proposal. Details are not described herein.

It should be noted that, the foregoing described specific examples of reference signals and objectives of specific processes are intended to use examples to describe principles of the functions of the reference signals and the specific processes of implementing the functions, but are not intended to limit the protection scope of the present disclosure. Actually, a person skilled in the art should understand that, in addition to the specific examples and specific processes described above, a reference signal having a corresponding function may alternatively be another existing or redesigned reference signal, and a corresponding process may alternatively be another existing or redesigned process. Therefore, the protection scope of the embodiments of the present disclosure should be understood as including all reference signals having the functions and all processes of implementing the functions.

In addition, a person skilled in the art should understand that in addition to the foregoing objectives, the reference signal in the technical solution provided in this embodiment of the present disclosure may be a reference signal used for another objective.

Different basic patterns may be designed for different reference signals. Different basic patterns may include different resources, and a resource occupied by one reference signal in a basic pattern of the reference signal may be different from a resource occupied by another reference signal in a basic pattern of the another reference signal. It should be noted that, different reference signals may be reference signals used for different objectives, or may be reference signals used for a same objective. For simplicity, different reference signals may be understood as reference signals corresponding to different antenna ports. In addition, a same basic pattern may correspond to a plurality of reference signals, and these reference signals may share, in a manner such as time division multiplexing, frequency division multiplexing, or code division multiplexing, a resource included in the basic pattern. In addition, a basic pattern of a reference signal should be known to a transmit end device of the reference signal and a receive end device of the reference signal. In a specific implementation process, the basic pattern of the reference signal may be predefined in a design specification of a communications standard or a communications system. In this case, in a process of manufacturing the transmit end device and the receive end device, the basic pattern of the reference signal may be prestored in the devices, or in a process of deploying the devices, the basic pattern of the reference signal may be configured for the devices, or in a communications network access process of the devices, the basic pattern of the reference signal may be dynamically configured by using various communication messages. For related technical solutions that various communication parameters are configured for the transmit end device and the receive end device, refer to the prior art. Details are not described herein.

The physical layer transmission unit may be, for example but not limited to, a physical layer frame, a slot, a resource element, or a combination of a plurality of resource elements. For a quantity of time-frequency resources included in the transmission unit, refer to a provision in the existing LTE standard. For example, for the physical layer frame, refer to a subframe or a frame in the LTE standard; for the slot, refer to a slot in the LTE standard; for the resource element, refer to a resource block in the LTE standard; and for a combination of the plurality of resource elements, refer to a resource block pair or a resource block group in the LTE standard. In addition, the physical layer transmission unit may be adjusted based on the foregoing unit described in the existing LTE standard, or may be reset based on a requirement of a system design.

In a specific implementation process, the basic pattern may be expressed in a plurality of forms such as a formula or a lookup table. For a specific expression form of the basic pattern, refer to the prior art. Details are not described herein.

In a specific implementation process, in step 304, the transmit end device sends the reference signal to the receive end device through the determined resource. To enable the receive end device to learn the resource that is allocated to the at least one basic pattern in the physical layer transmission unit, the method 300 may further include a step that the transmit end device notifies the receive end device of the resource that is allocated to the at least one basic pattern in the physical layer transmission unit. In a specific implementation process, the transmit end device may notify the information by using various types of signaling, for example but not limited to, physical layer signaling, media access control (MAC) layer signaling, and radio resource control (RRC) signaling. The information may carry, for example but not limited to, an index of a basic pattern, a quantity of basic patterns, and a location of a time-frequency resource occupied by each basic pattern in the physical layer transmission unit.

The physical layer signaling may also be referred to as Layer 1 (L1) signaling, and may usually be carried by a control portion of the physical layer transmission unit (for example, a physical layer frame). A typical example of the L1 signaling is downlink control information (DCI) carried in a physical downlink control channel (PDCCH) defined in an LTE standard. In some cases, the L1 signaling may alternatively be carried by a data portion of the physical layer frame. It can be easily learned that, a transmission period or a signaling period of the L1 signaling is usually a period of the physical layer frame. Therefore, the signaling is usually used to implement some dynamic control.

The media access control layer signaling belongs to Layer 2 signaling, and may usually be carried by, for example but not limited to, a frame header of a Layer 2 frame. The frame header may further carry information, for example but not limited to, information such as a source address and a destination address. In addition to the frame header, the Layer 2 frame usually further includes a frame body. In some cases, the L2 signaling may alternatively be carried by the frame body of the Layer 2 frame. A typical example of the Layer 2 signaling is signaling carried in a frame control field in a frame header of a MAC frame in the 802.11 series standard, or a MAC control entity defined in some protocols. The Layer 2 frame may usually be carried in a data portion in a physical layer frame. Alternatively, the foregoing information may be sent by using another type of Layer 2 signaling other than the media access control layer signaling.

The radio resource control signaling belongs to Layer 3 signaling, and is usually some control messages. The L3 signaling may usually be carried in a frame body of a Layer 2 frame. The L3 signaling usually has a relatively long transmission period or control period, and is suitable for sending some information that does not frequently change. For example, in some existing communications standards, the L3 signaling is usually used to carry some configuration information. Alternatively, the foregoing information may be sent by using another type of Layer 3 signaling other than the RRC signaling.

The foregoing is merely principle description of the physical layer signaling, the MAC layer signaling, the RRC signaling, the Layer 1 signaling, the Layer 2 signaling, and the Layer 3 signaling. For specific details about the three types of signaling, refer to the prior art. Details are not described herein in this specification.

In addition, in a specific implementation process, the information transferred through the signaling may specifically include a quantity of basic patterns of a reference signal in the physical layer transmission unit and a resource occupied by each basic pattern.

It can be easily learned that, arrangement of the reference signal carried in the basic pattern in the physical layer transmission unit can be set by adjusting a quantity of basic patterns carried in the physical layer transmission unit and a location of a resource occupied by each basic pattern in the physical layer transmission unit. It can be learned that, according to the technical solution provided in this embodiment of the present disclosure, compared with a fixed reference signal arrangement manner in the prior art, arrangement of the reference signal in the physical layer transmission unit can be flexibly set. Therefore, according to the technical solution provided in this embodiment of the present disclosure, based on a specific requirement, for example but not limited to, received signal quality of the receive end device, a channel state, a moving speed, a quantity of data streams for which spatial multiplexing is performed, a processing capability, a quantity of simultaneously scheduled receive end devices, a related design parameter of beam management, or system bandwidth, the transmit end device adjusts the quantity of basic patterns carried in the physical layer transmission unit and the location of the resource occupied by each basic pattern in the physical layer transmission unit, to flexibly adjust arrangement of the reference signal carried in the basic pattern in the physical layer transmission unit.

The basic pattern provided in this embodiment of the present disclosure is described below with reference to FIG. 4.

Figure 4:
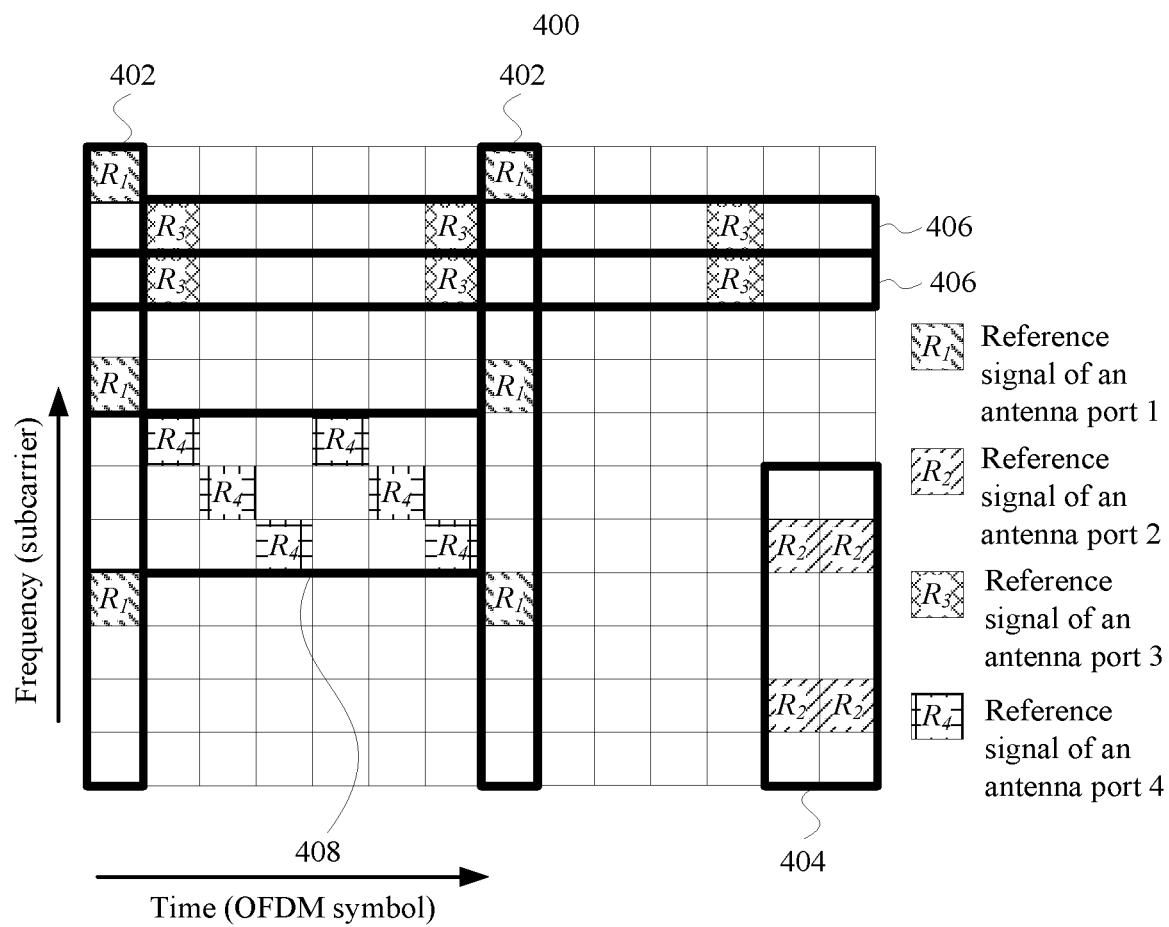
FIG. 4 is a schematic diagram of a logical structure of a physical layer transmission unit according to an embodiment of the present disclosure.

FIG. 4 is a schematic diagram of a logical structure of a physical layer transmission unit 400 according to an embodiment of the present disclosure. As shown in FIG. 4, the physical layer transmission unit 400 carries basic patterns corresponding to four reference signals: a basic pattern 402 corresponding to a reference signal R1, a basic pattern 404 corresponding to a reference signal R2, a basic pattern 406 corresponding to a reference signal R3, and a basic pattern 408 corresponding to a reference signal R4. In addition, the reference signal R1 corresponds to an antenna port 1, the reference signal R2 corresponds to an antenna port 2, the reference signal R3 corresponds to an antenna port 3, and the reference signal R4 corresponds to an antenna port 4. Therefore, the basic pattern 402 may also be referred to as a basic pattern corresponding to the antenna port 1, the basic pattern 404 may also be referred to as a basic pattern corresponding to the antenna port 2, the basic pattern 406 may also be referred to as a basic pattern corresponding to the antenna port 3, and the basic pattern 408 may also be referred to as a basic pattern corresponding to the antenna port 4. Actually, the antenna port and the reference signal are usually in a one-to-one correspondence, and can refer to each other. Therefore, the antenna port and the reference signal can be used interchangeably. For example, in the existing LTE standard, reference signals such as a CSI-RS, a CRS, and a DMRS separately correspond to different antenna ports, and these reference signals and these antenna ports can usually refer to each other or replace each other. A relationship between an antenna port and a reference signal is clearly described in the prior art. Therefore, details are not described herein.

Moreover, for the reference signal R1, the physical layer transmission unit 400 carries two basic patterns of the reference signal; for the reference signal R2, the physical layer transmission unit 400 carries one basic pattern of the reference signal; for the reference signal R3, the physical layer transmission unit 400 carries two basic patterns of the reference signal; and for the reference signal R4, the physical layer transmission unit 400 carries one basic pattern of the reference signal. In the physical layer transmission unit 400, the two basic patterns 402 of the reference signal R1 are non-consecutive in time domain. In other words, OFDM symbols on which the two basic patterns 402 are located are non-consecutive in time domain. In addition, in the physical layer transmission unit 400, the two basic patterns 406 of the reference signal R3 are consecutive in frequency domain. In other words, subcarriers on which the two basic patterns 406 are located are consecutive in frequency domain.

It should be noted that, a person skilled in the art should understand that, the physical layer transmission unit 400 shown in FIG. 4 is merely intended to use an example to describe a manner of carrying a basic pattern of a reference signal in a physical layer transmission unit, and is not intended to limit the protection scope of this embodiment of the present disclosure. In a specific implementation process, a quantity of reference signals corresponding to a basic pattern carried in the physical layer transmission unit, a quantity of basic patterns of each reference signal in the physical layer transmission unit, and a resource occupied by the basic pattern in the physical layer transmission unit may be set based on a specific requirement. Actually, according to the technical solution provided in this embodiment of the present disclosure, one physical layer transmission unit may carry a basic pattern of at least one reference signal. In addition, one physical layer transmission unit may carry one or more basic patterns of a same reference signal. Moreover, a resource occupied by each basic pattern of each reference signal in the physical layer transmission unit may be set based on a specific requirement. In other words, a location of each basic pattern of each reference signal in the physical layer transmission unit may be set based on a specific requirement. For example, in the physical layer transmission unit 400, the two basic patterns 402 of the reference signal R1 may be consecutively arranged in time domain. In addition, the two basic patterns 406 of the reference signal R3 may be non-consecutively arranged in frequency domain.

As shown in FIG. 4, the basic pattern 402 of the reference signal R1 occupies one OFDM symbol in time domain, and occupies a plurality of consecutive subcarriers in frequency domain; the basic pattern 404 of the reference signal R2 occupies two consecutive OFDM symbols in time domain, and occupies a plurality of consecutive subcarriers in frequency domain; the basic pattern 406 of the reference signal R3 occupies a plurality of consecutive OFDM symbols in time domain, and occupies one subcarrier in frequency domain; and the basic pattern 408 of the reference signal R4 occupies a plurality of consecutive OFDM symbols in time domain, and occupies three consecutive subcarriers in frequency domain.

It should be noted that, a person skilled in the art should understand that, the basic patterns of the reference signals shown in FIG. 4 are merely intended to use an example to describe a resource occupied by a basic pattern of a reference signal, and are not intended to limit the protection scope of this embodiment of the present disclosure. In a specific implementation process, a quantity of OFDM symbols occupied by the basic pattern of the reference signal in time domain, a quantity of subcarriers occupied by the basic pattern of the reference signal in frequency domain, and a resource occupied by the reference signal in the basic pattern of the reference signal may be set based on a specific requirement. Actually, according to the technical solution provided in this embodiment of the present disclosure, the basic pattern of the reference signal may occupy at least one OFDM symbol in time domain, and may occupy at least one subcarrier in frequency domain, the at least one OFDM symbol may be consecutive, and the at least one subcarrier may also be consecutive. In the basic pattern, the reference signal may occupy at least one OFDM symbol in time domain, and may occupy at least one subcarrier in frequency domain. For simplicity, the basic pattern of the reference signal may be set based on a specific requirement. For example, the quantity of OFDM symbols occupied by the basic pattern of the reference signal in time domain, the quantity of subcarriers occupied by the basic pattern of the reference signal in frequency domain, and the resource occupied by the reference signal in the basic pattern of the reference signal may be all set based on a specific requirement.

Figure 4A:
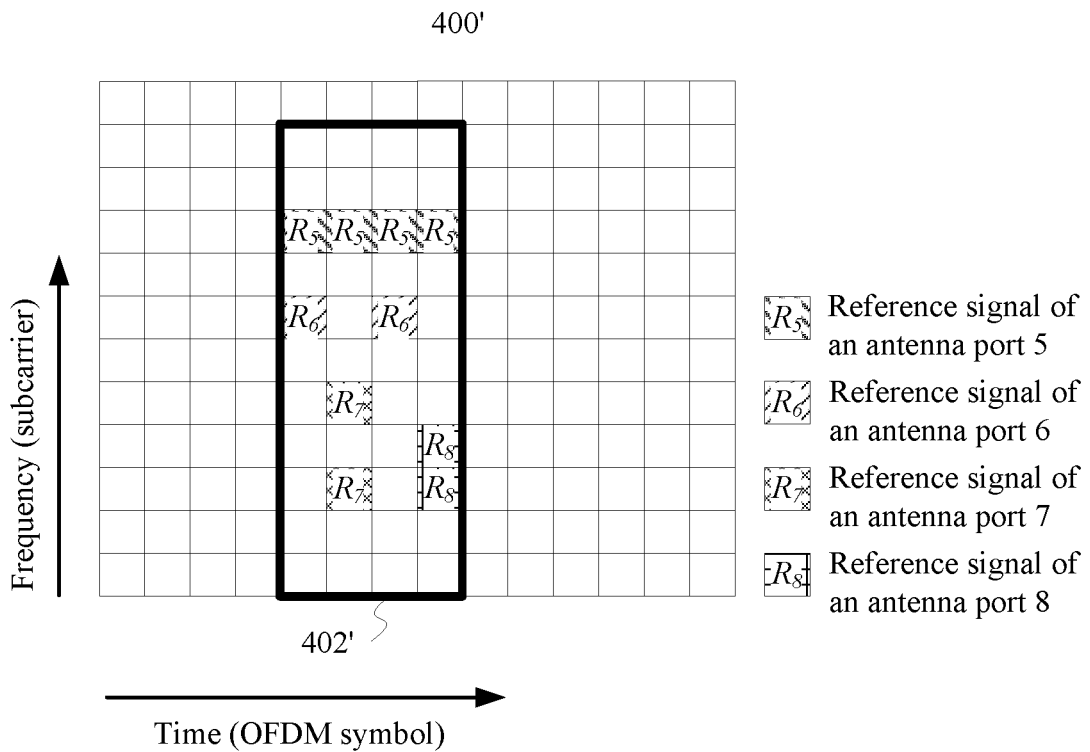
FIG. 4A is a schematic diagram of a logical structure of a physical layer transmission unit according to another embodiment of the present disclosure.

FIG. 4A is a schematic diagram of a logical structure of a physical layer transmission unit 400' according to another embodiment of the present disclosure. As shown in FIG. 4A, the physical layer transmission unit 400' carries a basic pattern 402', the basic pattern 402' carries reference signals R5, R6, R7, and R8, and the basic pattern corresponds to the reference signals R5, R6, R7, and R8. The reference signal R5 corresponds to an antenna port 5, the reference signal R6 corresponds to an antenna port 6, the reference signal R7 corresponds to an antenna port 7, and the reference signal R8 corresponds to an antenna port 8.

As shown in FIG. 4A, in the basic pattern 402', the reference signals R5, R6, R7, and R8 occupy different time-frequency resources, for example, occupy different resource elements. However, a person skilled in the art should understand that, in a specific implementation process, different reference signals may occupy a same time-frequency resource through manners, for example but not limited to, code division multiplexing.

It should be noted that, a person skilled in the art should understand that, the physical layer transmission unit 400' shown in FIG. 4A is merely intended to use an example to describe a manner of carrying a basic pattern in a physical layer transmission unit, and is not intended to limit the protection scope of this embodiment of the present disclosure. In a specific implementation process, a quantity of basic patterns in the physical layer transmission unit and a resource occupied by the basic pattern in the physical layer transmission unit may be set based on a specific requirement. Actually, according to the technical solution provided in this embodiment of the present disclosure, one physical layer transmission unit may carry at least one basic pattern. In addition, a resource occupied by the basic pattern in the physical layer transmission unit may be set based on a specific requirement.

As shown in FIG. 4A, in the basic pattern 402', the reference signal R5 occupies four consecutive OFDM symbols in time domain, and occupies one subcarrier in frequency domain; the reference signal R6 occupies two non-consecutive OFDM symbols in time domain, and occupies one subcarrier in frequency domain; the reference signal R7 occupies one OFDM symbol in time domain, and occupies two non-consecutive subcarriers in frequency domain; and the reference signal R8 occupies one OFDM symbol in time domain, and occupies two consecutive subcarriers in frequency domain.

It should be noted that, a person skilled in the art should understand that, the basic pattern 402' shown in FIG. 4A is merely intended to use an example to describe a resource occupied by a basic pattern and a resource occupied by each reference signal in the basic pattern, and is not intended to limit the protection scope of this embodiment of the present disclosure. In a specific implementation process, a quantity of OFDM symbols occupied by the basic pattern in time domain, a quantity of subcarriers occupied by the basic pattern in frequency domain, and the resource occupied by each reference signal in the basic pattern may be set based on a specific requirement. Actually, according to the technical solution provided in this embodiment of the present disclosure, the basic pattern may occupy at least one OFDM symbol in time domain, and may occupy at least one subcarrier in frequency domain, the at least one OFDM symbol may be consecutive, and the at least one subcarrier may also be consecutive. In the basic pattern, each reference signal may occupy at least one OFDM symbol in time domain, and occupy at least one subcarrier in frequency domain, and the occupied OFDM symbol and subcarrier may be consecutive, or may be non-consecutive. For simplicity, the basic pattern may be set based on a specific requirement. For example, the quantity of OFDM symbols occupied by the basic pattern in time domain, the quantity of subcarriers occupied by the basic pattern in frequency domain, and the resource occupied by each reference signal in the basic pattern may be all set based on a specific requirement.

Figure 5:
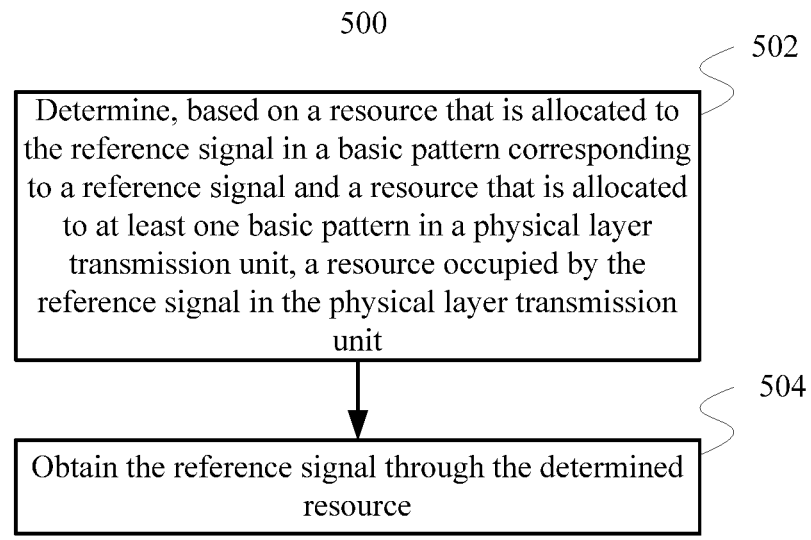
FIG. 5 is an example flowchart of a method for obtaining a reference signal according to an embodiment of the present disclosure.

FIG. 5 is a schematic flowchart of a method 500 for obtaining a reference signal according to an embodiment of the present disclosure. In a specific implementation process, the method 500 may be performed by a receive end device. The receive end device may be, for example but not limited to, the terminal devices 208 to 222 or the base stations 202 to 206 in FIG. 2.

Step 502: Determine, based on a resource that is allocated to the reference signal in a basic pattern corresponding to a reference signal and a resource that is allocated to at least one basic pattern in a physical layer transmission unit, a resource occupied by the reference signal in the physical layer transmission unit.

Step 504: Obtain the reference signal through the determined resource.

In the method 500, the basic pattern may occupy at least one OFDM symbol in time domain, and may occupy at least one subcarrier in frequency domain. In addition, in the basic pattern, the reference signal may occupy at least one OFDM symbol in time domain, and may occupy at least one subcarrier in frequency domain. In other words, the resource that is allocated to the reference signal in the basic pattern corresponding to the reference signal may include at least one OFDM symbol in time domain, and may include at least one subcarrier in frequency domain. More specifically, the at least one OFDM symbol occupied by the reference signal in the basic pattern in time domain may be a plurality of consecutive OFDM symbols.

The reference signal is used for at least one of the following objectives:
  determining channel state information;
  performing beam management; and
  demodulating a received signal.

In a specific implementation process, to enable the receive end device to learn the resource that is allocated to the at least one basic pattern in the physical layer transmission unit, a transmit end device may also notify the receive end device of the resource that is allocated to the at least one basic pattern in the physical layer transmission unit. Therefore, the method 500 may further include a step that the receive end device obtains the resource that is allocated to the at least one basic pattern in the physical layer transmission unit. Related technical details that the transmit end device notifies the receive end device of the resource that is allocated to the at least one basic pattern in the physical layer transmission unit are described above with reference to the method 300, and therefore are not described herein again.

The method 500 for obtaining a reference signal shown in FIG. 5 is a receive side method corresponding to the method 300 for sending a reference signal shown in FIG. 3, and technical features related to the method 500 are described above in detail with reference to accompanying drawings, for example but not limited to FIG. 3 and FIG. 4, and therefore are not described herein again.

Figure 6:
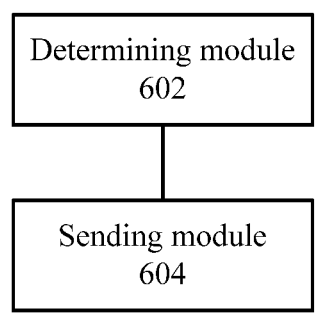
FIG. 6 is a schematic diagram of a logical structure of an apparatus for sending a reference signal according to an embodiment of the present disclosure.

FIG. 6 is a schematic diagram of a logical structure of an apparatus 600 for sending a reference signal according to an embodiment of the present disclosure. In a specific implementation process, the apparatus 600 may be a transmit end device. The transmit end device may be, for example but not limited to, the base stations 202 to 206 or the terminal devices 208 to 222 in FIG. 2. As shown in FIG. 6, the apparatus 600 includes a determining module 602 and a sending module 604.

The determining module 602 is configured to determine, based on a resource that is allocated to the reference signal in a basic pattern corresponding to a reference signal and a resource that is allocated to at least one basic pattern in a physical layer transmission unit, a resource to be occupied by the reference signal in the physical layer transmission unit.

The sending module 604 is configured to send the reference signal through the determined resource.

The basic pattern may occupy at least one OFDM symbol in time domain, and may occupy at least one subcarrier in frequency domain. In addition, in the basic pattern, the reference signal may occupy at least one OFDM symbol in time domain, and may occupy at least one subcarrier in frequency domain. In other words, the resource that is allocated to the reference signal in the basic pattern corresponding to the reference signal may include at least one OFDM symbol in time domain, and may include at least one subcarrier in frequency domain. More specifically, the at least one OFDM symbol occupied by the reference signal in the basic pattern in time domain may be a plurality of consecutive OFDM symbols.

The reference signal is used for at least one of the following objectives:
determining channel state information;
performing beam management; and
demodulating a received signal.

In a specific implementation process, the transmit end device sends the reference signal to a receive end device through the determined resource. To enable the receive end device to learn the resource that is allocated to the at least one basic pattern in the physical layer transmission unit, the transmit end device may also notify the receive end device of the resource that is allocated to the at least one basic pattern in the physical layer transmission unit. In a specific implementation process, such an operation may be performed by the sending module 604. Related technical details that the transmit end device notifies the receive end device of the resource that is allocated to the at least one basic pattern in the physical layer transmission unit are described above with reference to the method 300, and therefore are not described herein again.

The apparatus 600 is configured to perform the method 300 shown in FIG. 3. Technical features related to the apparatus 600 are described above in detail with reference to accompanying drawings, for example but not limited to FIG. 3 and FIG. 4, and therefore are not described herein again.

Figure 7:
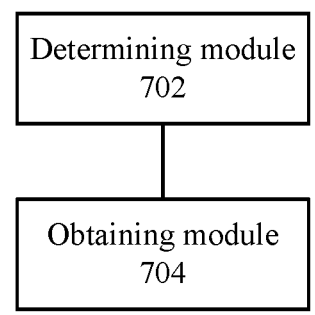
FIG. 7 is a schematic diagram of a logical structure of an apparatus for obtaining a reference signal according to an embodiment of the present disclosure.

FIG. 7 is a schematic diagram of a logical structure of an apparatus 700 for obtaining a reference signal according to an embodiment of the present disclosure. In a specific implementation process, the apparatus 700 may be a receive end device. The receive end device may be, for example but not limited to, the terminal devices 208 to 222 or the base stations 202 to 206 in FIG. 2. As shown in FIG. 7, the apparatus 700 includes a determining module 702 and an obtaining module 704.

The determining module 702 is configured to determine, based on a resource that is allocated to the reference signal in a basic pattern corresponding to a reference signal and a resource that is allocated to at least one basic pattern in a physical layer transmission unit, a resource occupied by the reference signal in the physical layer transmission unit.

The obtaining module 704 is configured to obtain the reference signal through the determined resource.

The basic pattern may occupy at least one OFDM symbol in time domain, and may occupy at least one subcarrier in frequency domain. In addition, in the basic pattern, the reference signal may occupy at least one OFDM symbol in time domain, and may occupy at least one subcarrier in frequency domain. In other words, the resource that is allocated to the reference signal in the basic pattern corresponding to the reference signal may include at least one OFDM symbol in time domain, and may include at least one subcarrier in frequency domain. More specifically, the at least one OFDM symbol occupied by the reference signal in the basic pattern in time domain may be a plurality of consecutive OFDM symbols.

The reference signal is used for at least one of the following objectives:
determining channel state information;
performing beam management; and
demodulating a received signal.

In a specific implementation process, a transmit end device sends the reference signal to the receive end device by using the determined resource. To enable the receive end device to learn the resource that is allocated to the at least one basic pattern in the physical layer transmission unit, the transmit end device may also notify the receive end device of the resource that is allocated to the at least one basic pattern in the physical layer transmission unit. In a specific implementation process, the determining module 702 may obtain the resource that is allocated to the at least one basic pattern in the physical layer transmission unit. Alternatively, a receiving module (not shown) may obtain the resource that is allocated to the at least one basic pattern in the physical layer transmission unit. Related technical details that the transmit end device notifies the receive end device of the resource that is allocated to the at least one basic pattern in the physical layer transmission unit are described above with reference to the method 300, and therefore are not described herein again.

The apparatus 700 is a receive side apparatus corresponding to the apparatus 600, and is configured to perform the method 500 shown in FIG. 5. Technical features related to the apparatus 700 are described above in detail with reference to accompanying drawings, for example but not limited to FIG. 3 and FIG. 4, and therefore are not described herein again.

Figure 8:
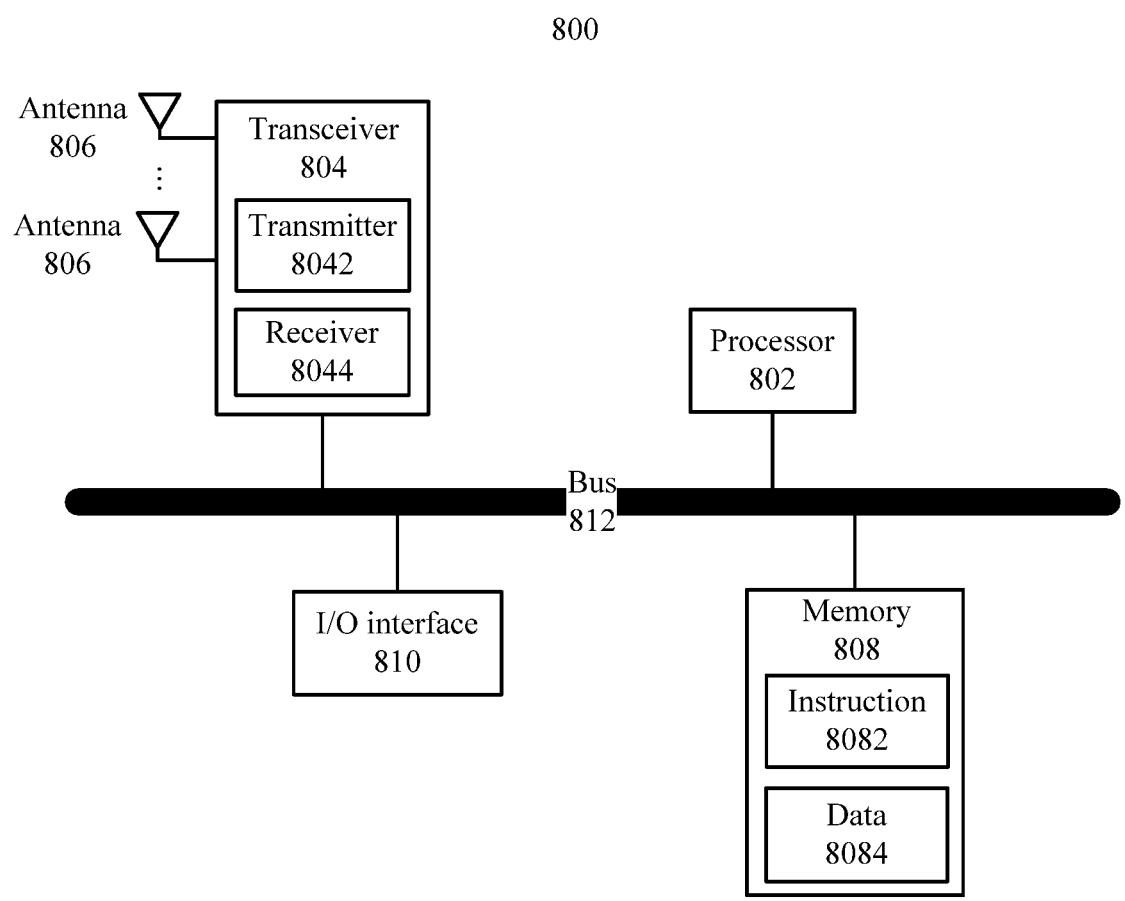
FIG. 8 is a schematic diagram of a hardware structure of an apparatus for sending a reference signal according to an embodiment of the present disclosure.

FIG. 8 is a schematic diagram of a hardware structure of an apparatus 800 for sending a reference signal according to an embodiment of the present disclosure. As shown in FIG. 8, the apparatus 800 includes a processor 802, a transceiver 804, a plurality of antennas 806, a memory 808, an I/O (input/output, Input/Output) interface 810, and a bus 812. The transceiver 804 further includes a transmitter 8042 and a receiver 8044. The memory 808 is further configured to store an instruction 8082 and data 8084. In addition, the processor 802, the transceiver 804, the memory 808, and the I/O interface 810 are in communication connection with each other by using the bus 812, and the plurality of antennas 806 are connected to the transceiver 804.

The processor 802 may be a general purpose processor, for example but not limited to, a central processing unit (Central Processing Unit, CPU), or may be a special purpose processor, for example but not limited to, a digital signal processor (Digital Signal Processor, DSP), an application-specific integrated circuit (Application-Specific Integrated Circuit, ASIC), or a field programmable gate array (Field Programmable Gate Array, FPGA). In addition, the processor 802 may alternatively be a combination of a plurality of processors. Particularly, in the technical solution provided in this embodiment of the present disclosure, the processor 802 may be configured to perform, for example, step 302 in the method 300 for sending a reference signal shown in FIG. 3, and an operation performed by the determining module 602 in the apparatus 600 for sending a reference signal shown in FIG. 6. The processor 802 may be a processor specially designed to perform the foregoing step and/or operation, or may be a processor that performs the foregoing step and/or operation by reading and executing the instruction 8082 stored in the memory 808. The processor 802 may need to use the data 8084 when performing the foregoing step and/or operation.

The transceiver 804 includes the transmitter 8042 and the receiver 8044. The transmitter 8042 is configured to send a signal by using at least one of the plurality of antennas 806. The receiver 8044 is configured to receive a signal by using at least one of the plurality of antennas 806. Particularly, in the technical solution provided in this embodiment of the present disclosure, the transmitter 8042 may be specifically configured to perform, for example, step 304 and the step of notifying the receive end device of the resource that is allocated to the at least one basic pattern in the physical layer transmission unit in the method 300 for sending a reference signal shown in FIG. 3, and an operation performed by the sending module 604 in the apparatus 600 for sending a reference signal shown in FIG. 6, by using at least one of the plurality of antennas 806.

The memory 808 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 808 is specifically configured to store the instruction 8082 and the data 8084. The processor 802 may perform the foregoing step and/or operation by reading and executing the instruction 8082 stored in the memory 808, and may need to use the data 8084 when performing the foregoing step and/or operation.

The I/O interface 810 is configured to receive an instruction and/or data from a peripheral device, and output an instruction and/or data to the peripheral device.

It should be noted that, in a specific implementation process, the apparatus 800 may further include other hardware devices, which are not enumerated in this specification.

Figure 9:
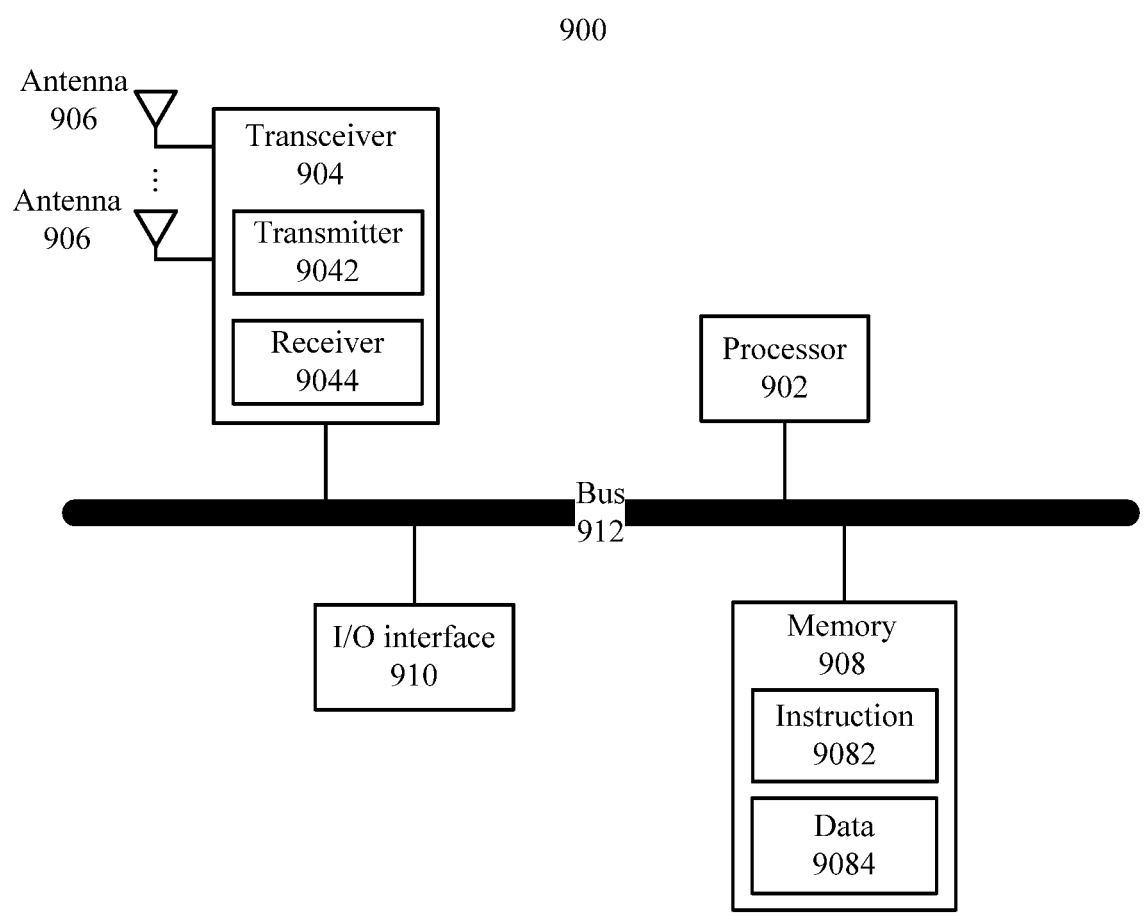
FIG. 9 is a schematic diagram of a hardware structure of an apparatus for obtaining a reference signal according to an embodiment of the present disclosure.

FIG. 9 is a schematic diagram of a hardware structure of an apparatus 900 for obtaining a reference signal according to an embodiment of the present disclosure. As shown in FIG. 9, the apparatus 900 includes a processor 902, a transceiver 904, a plurality of antennas 906, a memory 908, an I/O (Input/Output) interface 910, and a bus 912. The transceiver 904 further includes a transmitter 9042 and a receiver 9044. The memory 908 is further configured to store an instruction 9082 and data 9084. In addition, the processor 902, the transceiver 904, the memory 908, and the I/O interface 910 are in communication connection with each other by using the bus 912, and the plurality of antennas 906 are connected to the transceiver 904.

The processor 902 may be a general purpose processor, for example but not limited to, a central processing unit (CPU), or may be a special purpose processor, for example but not limited to, a digital signal processor (DSP), an application-specific integrated circuit (ASIC), or a field programmable gate array (FPGA). In addition, the processor 902 may alternatively be a combination of a plurality of processors. Particularly, in the technical solution provided in this embodiment of this application, the processor 902 is configured to perform, for example, step 502, step 504, and the step of obtaining the resource that is allocated to the at least one basic pattern in the physical layer transmission unit in the method 500 for obtaining a reference signal shown in FIG. 5, and operations performed by the determining module 702 and the obtaining module 704 in the apparatus 700 for obtaining a reference signal shown in FIG. 7. The processor 902 may be a processor specially designed to perform the foregoing step and/or operation, or may be a processor that performs the foregoing step and/or operation by reading and executing the instruction 9082 stored in the memory 908. The processor 902 may need to use the data 9084 when performing the foregoing step and/or operation.

The transceiver 904 includes the transmitter 9042 and the receiver 9044. The transmitter 9042 is configured to send a signal by using at least one of the plurality of antennas 906. The receiver 9044 is configured to receive a signal by using at least one of the plurality of antennas 906. Particularly, in the technical solution provided in this embodiment of the present disclosure, the receiver 9044 may be configured to perform an operation performed by the receiving module in the apparatus 700 shown in FIG. 7.

The memory 908 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 908 is specifically configured to store the instruction 9082 and the data 9084. The processor 902 may perform the foregoing step and/or operation by reading and executing the instruction 9082 stored in the memory 908, and may need to use the data 9084 when performing the foregoing step and/or operation.

The I/O interface 910 is configured to receive an instruction and/or data from a peripheral device, and output an instruction and/or data to the peripheral device.

It should be noted that, in a specific implementation process, the apparatus 900 may further include other hardware devices, which are not enumerated in this specification.

The foregoing descriptions are merely examples of embodiments of the present disclosure, and are not intended to limit the scope of the present disclosure. Any modification, equivalent replacement, or improvement made without departing from the spirit and principle of the present disclosure should fall within the protection scope of the present disclosure. For example, when the technical solutions provided in the embodiments of the present disclosure are applied to a particular scenario or a particular condition, all other processing steps added before, during, and/or after steps of the methods provided in the embodiments of the present disclosure and other processing modules added to the apparatuses provided in the embodiments of the present disclosure to complete additional processing should be considered as further improvements made based on the technical solutions provided in the embodiments of the present disclosure, and therefore fall within the scope of the present disclosure.

It should be understood that sequence numbers of the foregoing processes do not mean particular execution sequences in the embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, and are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for obtaining a reference signal, comprising:
   determining, based on a resource that is allocated to a reference signal in a basic pattern corresponding to the reference signal and a resource that is allocated to at least one basic pattern in a physical layer transmission unit, a resource occupied by the reference signal in the physical layer transmission unit, wherein the physical layer transmission unit comprises the at least one basic pattern, and the physical layer transmission unit further comprises a plurality of resources which are not occupied by the at least one basic pattern; and
   obtaining the reference signal through the determined resource;
   wherein the method further comprises receiving information indicating the resource is allocated to the at least one basic pattern in the physical layer transmission unit, and
   wherein the basic pattern occupies a plurality of consecutive Orthogonal Frequency Division Multiplexing (OFDM) symbols in a time domain, and occupies a plurality of consecutive subcarriers in a frequency domain.

2. The method according to claim 1, wherein in the basic pattern, the reference signal occupies at least one OFDM symbol in a time domain, and occupies at least one subcarrier in a frequency domain.

3. The method according to claim 2, wherein the at least one OFDM symbol occupied by the reference signal in the basic pattern in the time domain is a plurality of consecutive OFDM symbols.

4. The method according to claim 1, wherein the reference signal is used for at least one of the following objectives:
   determining channel state information;
   performing beam management; and
   demodulating a received signal.

5. The method according to claim 1, wherein the information indicating the resource is allocated to the at least one basic pattern in the physical layer transmission unit is transmitted through radio resource control (RRC) signaling.

6. The method according to claim 1, wherein the method further comprises receiving information indicating the resource is allocated to the at least one basic pattern in the physical layer transmission unit.

7. The method according to claim 1, wherein the information indicating the resource is allocated to the at least one basic pattern in the physical layer transmission unit is transmitted through radio resource control (RRC) signaling.

8. An apparatus for obtaining a reference signal, comprising:
   a processor, configured to determine, based on a resource that is allocated to a reference signal in a basic pattern corresponding to the reference signal and a resource that is allocated to at least one basic pattern in a physical layer transmission unit, a resource occupied by the reference signal in the physical layer transmission unit, wherein the physical layer transmission unit comprises the at least one basic pattern, and the physical layer transmission unit further comprises a plurality of resources which are not occupied by the at least one basic pattern; and
   a transceiver, configured to obtain the reference signal through the determined resource;
   wherein the transceiver is further configured to receive information indicating the resource is allocated to the at least one basic pattern in the physical layer transmission unit, and
   wherein the basic pattern occupies a plurality of consecutive Orthogonal Frequency Division Multiplexing (OFDM) symbols in a time domain, and occupies a plurality of consecutive subcarriers in a frequency domain.

9. The apparatus according to claim 8, wherein in the basic pattern, the reference signal occupies at least one OFDM symbol in a time domain, and occupies at least one subcarrier in a frequency domain.

10. The apparatus according to claim 9, wherein the at least one OFDM symbol occupied by the reference signal in the basic pattern in the time domain is a plurality of consecutive OFDM symbols.

11. The apparatus according to claim 8, wherein the reference signal is used for at least one of the following objectives:
   determining channel state information;
   performing beam management; and
   demodulating a received signal.

12. The apparatus according to claim 8, wherein the information indicating the resource is allocated to the at least one basic pattern in the physical layer transmission unit is transmitted through radio resource control (RRC) signaling.

13. A non-transitory computer storage medium, wherein the computer storage medium stores computer program instructions, and when the computer program instructions run on a computer, the computer is configured to perform a method comprising:
   determining, based on a resource that is allocated to a reference signal in a basic pattern corresponding to the reference signal and a resource that is allocated to at least one basic pattern in a physical layer transmission unit, a resource occupied by the reference signal in the physical layer transmission unit, wherein the physical layer transmission unit comprises the at least one basic pattern, and the physical layer transmission unit further comprises a plurality of resources which are not occupied by the at least one basic pattern; and
   obtaining, the reference signal through the determined resource;
   wherein the method further comprises receiving information indicating the resource is allocated to the at least one basic pattern in the physical layer transmission unit, and
   wherein the basic pattern occupies a plurality of consecutive Orthogonal Frequency Division Multiplexing (OFDM) symbols in a time domain, and occupies a plurality of consecutive subcarriers in a frequency domain.

14. The non-transitory computer storage medium according to claim 13, wherein in the basic pattern, the reference signal occupies at least one OFDM symbol in a time domain, and occupies at least one subcarrier in a frequency domain.

15. The non-transitory computer storage medium according to claim 14, wherein the at least one OFDM symbol occupied by the reference signal in the basic pattern in the time domain is a plurality of consecutive OFDM symbols.

16. The non-transitory computer storage medium according to claim 13, wherein the reference signal is used for at least one of the following objectives:
   determining channel state information;
   performing beam management; and
   demodulating a received signal.

17. The non-transitory computer storage medium according to claim 13, wherein the information indicating the resource is allocated to the at least one basic pattern in the physical layer transmission unit is transmitted through radio resource control (RRC) signaling.

* * * * *